(12) United States Patent
Lok et al.

(10) Patent No.: US 9,904,249 B2
(45) Date of Patent: Feb. 27, 2018

(54) OPTICAL SECURITY DEVICE HAVING A HIGH REFRACTIVE INDEX LAYER BETWEEN ADJACENT DIFFRACTION ELEMENTS WHICH HAVE UPPER PORTIONS UNCOVERED BY THE HIGH REFRACTIVE INDEX LAYER

(71) Applicant: Innovia Security Pty Ltd, Craigieburn, Victoria (AU)

(72) Inventors: Phei Lok, Craigieburn (AU); Gary Fairless Power, Craigieburn (AU); Benjamin Stevens, Craigieburn (AU)

(73) Assignee: CCL Secure Pty Ltd, Craigieburn, Victoria (AU)

( * ) Notice: Subject to any disclaimer, the term of this patent is extended or adjusted under 35 U.S.C. 154(b) by 394 days.

(21) Appl. No.: 14/399,097

(22) PCT Filed: May 6, 2013

(86) PCT No.: PCT/AU2013/000491
§ 371 (c)(1),
(2) Date: Nov. 5, 2014

(87) PCT Pub. No.: WO2013/166560
PCT Pub. Date: Nov. 14, 2013

(65) Prior Publication Data
US 2015/0109647 A1    Apr. 23, 2015

(30) Foreign Application Priority Data

May 10, 2012   (AU) ................................. 2012100573

(51) Int. Cl.
*G03H 1/00*   (2006.01)
*B42D 25/328* (2014.01)
(Continued)

(52) U.S. Cl.
CPC ........... *G03H 1/0011* (2013.01); *B42D 25/29* (2014.10); *B42D 25/324* (2014.10);
(Continued)

(58) Field of Classification Search
CPC ...... G02B 5/18; G02B 5/1814; G02B 5/1819; G02B 5/1828; G02B 5/1842;
(Continued)

(56) References Cited

U.S. PATENT DOCUMENTS 6,903,850 B2   6/2005 Kay et al.
2004/0100707 A1* 5/2004 Kay ...................... B42D 25/29
359/883

(Continued)

FOREIGN PATENT DOCUMENTS

WO    WO 2012/041851 A1    4/2012

OTHER PUBLICATIONS

International Search Report and Written Opinion from International Application No. PCT/AU2013/000491, dated Jun. 24, 2013.
(Continued)

*Primary Examiner* — Stephone B Allen
*Assistant Examiner* — Ryan S Dunning
(74) *Attorney, Agent, or Firm* — Christopher M. Scherer; DeWitt Ross & Stevens S.C.

(57) ABSTRACT

An optical security device is disclosed which includes a diffraction layer having a plurality of diffraction elements and a high refractive index layer, wherein the high refractive index layer is applied on the diffraction layer such that selected regions of the diffraction layer have the corresponding diffraction elements partially uncovered by the high refractive index layer and other regions are substantially covered by the high refractive index layer. Accordingly, the optical security device has a first security feature associated with the diffraction layer and a second security feature (Continued)

associated with the high refractive index layer. An image is viewable from the regions of the high refractive index layer, either, covertly by placed an index matched item over the device or, overtly, through selection of the thickness of the high refractive index layer.

13 Claims, 3 Drawing Sheets

(51) Int. Cl.
    *G02B 5/18*     (2006.01)
    *G06K 19/16*     (2006.01)
    *G02B 5/00*     (2006.01)
    *B42D 25/29*     (2014.01)
    *B42D 25/324*     (2014.01)
    *G03H 1/02*     (2006.01)
    *G03H 1/18*     (2006.01)

(52) U.S. Cl.
    CPC ............ *B42D 25/328* (2014.10); *G02B 5/00* (2013.01); *G02B 5/1819* (2013.01); *G03H 1/0244* (2013.01); *G03H 1/0256* (2013.01); *G06K 19/16* (2013.01); *G02B 5/1842* (2013.01); *G03H 1/0236* (2013.01); *G03H 2001/0016* (2013.01); *G03H 2001/0027* (2013.01); *G03H 2001/187* (2013.01); *G03H 2250/36* (2013.01)

(58) Field of Classification Search
    CPC .. G02B 5/1847; G02B 5/1852; G02B 5/1866; G02B 2005/1804; G02B 5/1861; G03H 1/0011; G03H 1/0016; G03H 1/0236; G03H 1/0244; G03H 1/0252; G03H 1/0256; G03H 2001/187; G03H 2223/23; G03H 2250/56; G03H 1/0276; B41M 3/14; B42D 25/30; B42D 25/328; B42D 25/425; B42D 25/45; B42D 25/46; G06K 19/16; G07D 7/0013
    USPC ...... 283/86; 359/2, 558, 566–569, 571, 572, 359/575, 576; 427/162
    See application file for complete search history.

(56) References Cited

U.S. PATENT DOCUMENTS

| | | | |
|---|---|---|---|
| 2007/0058260 A1* | 3/2007 | Steenblik | G02B 27/2214 359/626 |
| 2009/0244519 A1* | 10/2009 | Whiteman | B42D 25/29 356/71 |
| 2010/0060987 A1* | 3/2010 | Witzman | G02B 5/286 359/589 |
| 2013/0208327 A1* | 8/2013 | Bolle | B41M 3/144 359/2 |

OTHER PUBLICATIONS

International Preliminary Report on Patentability (Chapter II) from International Application No. PCT/AU2013/000491, dated Mar. 18, 2014.

* cited by examiner (A)

(B)

(C)

OPTICAL SECURITY DEVICE HAVING A HIGH REFRACTIVE INDEX LAYER BETWEEN ADJACENT DIFFRACTION ELEMENTS WHICH HAVE UPPER PORTIONS UNCOVERED BY THE HIGH REFRACTIVE INDEX LAYER

FIELD OF THE INVENTION

The present invention relates to an optical security device and, particularly but not exclusively, to a covert feature for an optical security device.

BACKGROUND TO THE INVENTION

The use of holograms as a security device is well established in the field of security documents, such as banknotes, passports, cheques, share certificates and the like. Holograms are, potentially, less challenging to counterfeiters to replicate because they are, relatively, well known and, relatively, well understood.

In order to reduce the risk of counterfeiting, many advances have been made in the field of holograms. However, these technological advances are, generally, in the area relating to metallic and reflective holograms. To increase the level of security in holograms, that is, to make counterfeiting or replication difficult, the complexity of the hologram design can be increased or a covert feature, such as a polarization layer within a diffractive hologram, is added. Polarization features require a reflective backing, and are only suitable for reflective holograms.

SUMMARY OF THE INVENTION

According to a first aspect of the present invention, there is provided an optical security device including a diffraction layer having a plurality of diffraction elements and a high refractive index layer, wherein the high refractive index layer is applied on the diffraction layer such that first diffractive regions of the diffraction layer have the corresponding diffraction elements partially uncovered by the high refractive index layer and second diffractive regions are substantially covered by the high refractive index layer.

Preferably, the first and second diffractive regions are arranged to form an image.

Preferably, the difference in coverage between the partially uncovered diffraction elements in the first diffractive regions and the substantially covered diffraction elements in the second diffractive regions cause a difference in brightness of the first and second diffractive regions which is substantially imperceptible when viewed by the human eye without any aids under normal lighting conditions, such that a covert security feature is formed.

Alternatively, the difference in coverage between the partially uncovered diffraction elements in the first diffractive regions and the substantially covered diffraction elements in the second diffractive regions cause a difference in brightness of the first and second diffractive regions which is substantially perceptible when viewed by the human eye without any aids under normal lighting conditions, such that a overt security feature is formed.

Preferably, the diffraction layer has diffraction elements having depths which are substantially the same and the high refractive index layer is varied in thickness to partially cover diffraction elements in the first diffractive regions and substantially cover diffraction elements in the second diffractive regions.

Alternatively, the high refractive index layer is of substantially constant depth and the diffraction layer has diffraction elements in the first diffractive regions having depths which are greater than the depth of the high refractive index layer and diffraction elements in the second diffractive regions having depths which are substantially the same as the depth of the high refractive index layer.

Preferably, the regions where the high refractive index layer partially covers diffractive regions is formed in a pattern of lines or fine screens. This will help make the presence of this region less perceptible when viewed.

Preferably, the first diffractive regions have sub-regions where the amount that the diffraction elements are partially uncovered is varied.

Preferably, the sub-regions of the first diffractive regions form areas of a greyscale image.

Preferably, the diffraction layer is one or more of the following: a transparent hologram; a reflective hologram; or a diffractive optical variable device.

According to a second aspect of the present invention, there is provided a security document including an optical security device according to the first aspect of the present invention.

Preferably, the security document is a bank note.

According to a third aspect of the present invention, there is provided a method of manufacturing an optical security device including forming a diffraction layer having a plurality of diffraction elements and a high refractive index layer, wherein the high refractive index layer is applied on the diffraction layer such that first diffractive regions of the diffraction layer have the corresponding diffraction elements partially uncovered by the high refractive index layer and second diffractive regions are substantially covered by the high refractive index layer.

Preferably, the high refractive index layer is printed on to the diffraction layer.

According to a fourth aspect of the present invention, there is provided s method of authenticating an optical security device according to the first aspect of the present invention, the method including contacting the optical security device with an index matched material, such as an item or liquid, and subsequently inspecting for change in brightness of a portion of the an optical security device.

BRIEF DESCRIPTION OF THE DRAWINGS

Embodiments of the invention will now be described with reference to the accompanying drawings. It is to be appreciated that the embodiments are given by way of illustration only and the invention is not limited by this illustration. In the drawings.

DESCRIPTION OF PREFERRED EMBODIMENT

Whilst covert features, such as polarisation layers, have been added to reflective diffractive optical devices, such as holograms, these features have not been appropriate for transparent diffractive devices, such as transparent holograms.

An optical security device according to an embodiment of the invention has a diffraction layer, which has a diffraction structure which includes a plurality of diffractive elements, and a High Refractive Index (HRI) layer. The HRI layer is applied in differing thicknesses to provide a further level of authentication. This can be a covert feature, that is, a feature which is not apparent to the general user, or an overt feature. The optical security device may be applied to security documents, such as banknotes, passports, cheques, share certificates and the like.

Figure 1:
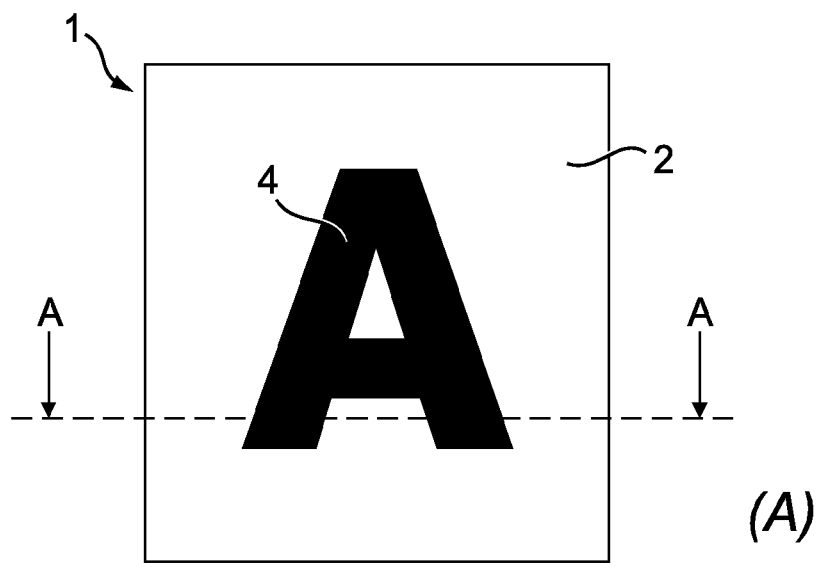
FIG. 1 illustrates:
(a) an optical security device including two portions,
(b) a cross-sectional view of the optical security device showing portions fully coated and partially coated with a High Refractive Index (HRI) layer, and
(c) portions fully coated and partially coated with the HRI layer.
Figure 1:
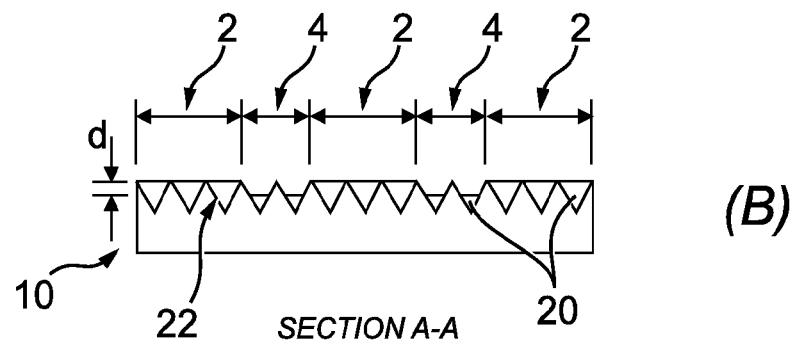
Figure 1:
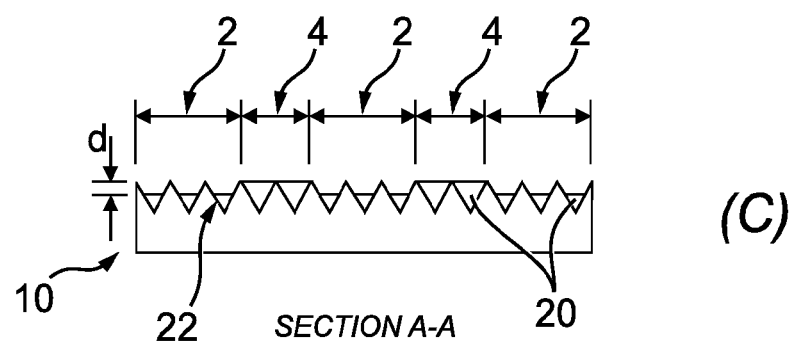

Referring to FIG. 1(a), an optical security device 1 having a first diffractive region 2 and a second diffractive region 4, both regions contain diffractive structures including a plurality of diffractive elements. The first region 2 and the second region 4 create an image, such as the letter 'A' provided by the second region 4, which is separate to any optical effect or images created by the diffractive regions 2, 4. Referring now also to FIG. 1 (b), which shows cross-sectional view A-A from FIG. 1(a), the surface of the first diffractive region 2 and second diffractive region 4 is provided with an HRI layer 20. The HRI layer 20 is applied to the first diffractive region 2 at a first thickness and the second diffractive region 4 at a second thickness, the difference between the thicknesses in the first and second regions being 'd'.

It should be noted that "image" as used herein, includes text and other characters, as well as other shapes, depictions and pictures.

In this example, the first diffractive region 2 has an HRI layer thickness which encompasses the individual diffractive elements 22. That is, the diffractive elements 22 are fully covered by the HRI layer 20. In the second diffractive region 4, the HRI layer 20 is applied at a different thickness such that portions of the individual diffractive elements 22 are not covered by the HRI layer 20.

The thickness difference d is chosen such that it does not create a substantial difference in brightness of the first portion 2 and second portion 4 when viewed normally. That is, the image shown in FIG. 1 (a) of the letter 'A' is not perceptible by a user under typical lighting conditions. It should be noted that, when designing the optical security element, it is possible to adjust the design of the diffraction layer to aid compensation for any brightness difference caused by not fully covering all the diffractive elements in an HRI layer. For example, the second diffractive region 4 may be designed, by varying the frequencies and/or depths of the gratings, to produce a slightly duller image. In this manner, the first and second diffractive regions 2, 4 can be appropriately matched for brightness. In addition, or alternatively, the regions where the HRI layer partially covers diffractive regions can be formed in a pattern of lines or fine screens. This will help make the presence of this region less perceptible when viewed by a user.

The letter 'A' is viewable when authenticated by an index matched authenticating material. An index matched authenticating material is a fluid, layer or item with the same refractive index as the material used to produce the first and second diffractive regions 2, 4.

For example, the optical security device 1 could be authenticated by:
immerse the device in an index matched liquid; or
place droplets of an index matched liquid or smear an index matched liquid/gel onto the optical security device; or
place a clear/transparent tape which has an adhesive which is index matched onto the optical security device.

Accordingly, the optical security device has a first security feature associated with the diffraction layer and a second security feature associated with the high refractive index layer. An image is viewable from the regions of the high refractive index layer, either, covertly by placed an index matched material over the device or, overtly, through selection of the thickness of the high refractive index layer.

To explain further the effect that enables the optical security device described herein, when a diffractive structure has not been coated with an HRI layer, it appears much brighter than when it is fully coated. By coating some areas of the optical security device fully and others only partially with an HRI layer, it is possible to produce an optical security device where no perceptible difference in brightness is noticeable between the two regions (first and second regions 2, 4 as described above). However, when an index matched material is placed on the surface of the optical security device, the regions which are not coated fully by the HRI layer (second region 4, in the example above) diminish in brightness, whereas the regions coated fully do not (first region 2, in the example above). Accordingly, careful selection of the thickness of the HRI coating in the second region 4, as the thickness of the first region 2 is dictated by the depth of the diffractive elements 2, allows the difference between the two regions to be substantially imperceptible for a user in normal viewing conditions but viewable under an index matched authenticating material.

For the avoidance of doubt, "normal" viewing conditions in this context refer to the viewing of the optical security device by the human eye without any aids, such as a magnifying glass, microscope or other enhanced viewing device or authenticating device. It also refers to viewing the optical security device in "normal" lighting conditions, which would, typically, be daylight or typical indoor lighting.

FIG. 1(c) shows an alternative embodiment of the optical security device 1 of FIG. 1(a). In this example, the first region 2 is partially coated with the HRI layer 20, and the second portion 4 is fully coated with the HRI layer 20. That is, FIG. 1(c) has the thicknesses of the HRI layer 20 of FIG. 1(b) reversed between the first and second regions 2, 4. The image produced by FIG. 1(c), when viewed by an authenticating item, is the negative of the image shown in FIG. 1(a). It is within the scope of the present invention to have a plurality of regions in an optical security device with varying thickness of the HRI layer.

FIGS. 2(a), 2(b) and 2(c) show an alternative embodiment. FIG. 2(a), once again, shows an optical security device 1 having a first diffractive region 2 and a second diffractive region 4. Instead of varying the thickness of the HRI layer, as in the embodiment described in relation to FIG. 1, an HRI layer 30 is provided at a constant thickness. The depth of the diffraction elements 24, 26 of the first and second regions 2, 4 are varied such that, as shown in FIG. 2(b), diffraction elements 24 are only partially covered by the HRI layer 30. Whereas, diffraction elements 26, which correspond to first diffractive region 2, are fully covered by the HRI layer 30. In this embodiment, it is the difference in height of the diffractive elements 24 and 26 which provide the difference in brightness levels. Therefore, the height difference between the diffractive elements 24, 26 in the first and second regions 2,4 is chosen such that the difference between the first and second regions is substantially imperceptible.

In the same manner as the embodiment described in relation to FIG. 1, providing an index matched authenticating material on the surface of the optical security device 1 results in the second diffractive region 4 diminishing in brightness, whilst the first diffractive region 2 is relatively unaffected.

Once again, as shown in relation to FIG. 2(c), it is possible to reverse create a first diffractive region 2 with diffractive elements which are not wholly covered by the HRI layer 30 and a second diffractive region 4 with diffractive elements which are covered by the HRI layer 30. In this case, the first diffractive region 2 diminished in brightness relative to the second diffractive region 4, when authenticated by an index matched authenticating material.

Although not shown in the drawings, it is within the scope of the invention to combine features as described in relation to FIGS. 1a to 1c with those of FIGS. 2a to 2c. For example, an optical security device having an HRI layer of varying thickness in different regions may also have the depths of the diffractive structure varied in those or in other regions.

An index matched material is an item or fluid, as discussed above, with substantially the same refractive index as the material used to produce the diffractive structure. Examples of index matched materials include cooking oil, glue, Scotch® tape, dishwashing liquid detergent and acetone. When any one of the above mentioned methods of authentication is applied to a optical security device as described herein, the parts of the diffractive structure that are not substantially covered by an HRI layer will diminish in brightness, showing the covert design. Subsequently, the index matched material can be removed by wiping, washing or other method.

Figure 3:
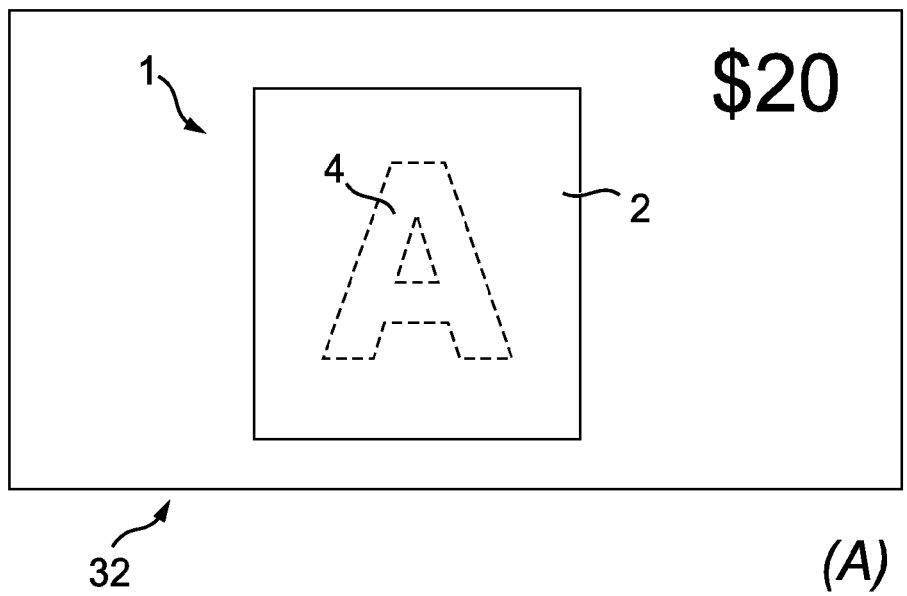
FIG. 3 illustrates:
(a) an optical security device before contacting an index matched material, and
(b) the optical security device after contacting an index matched material.
Figure 3:
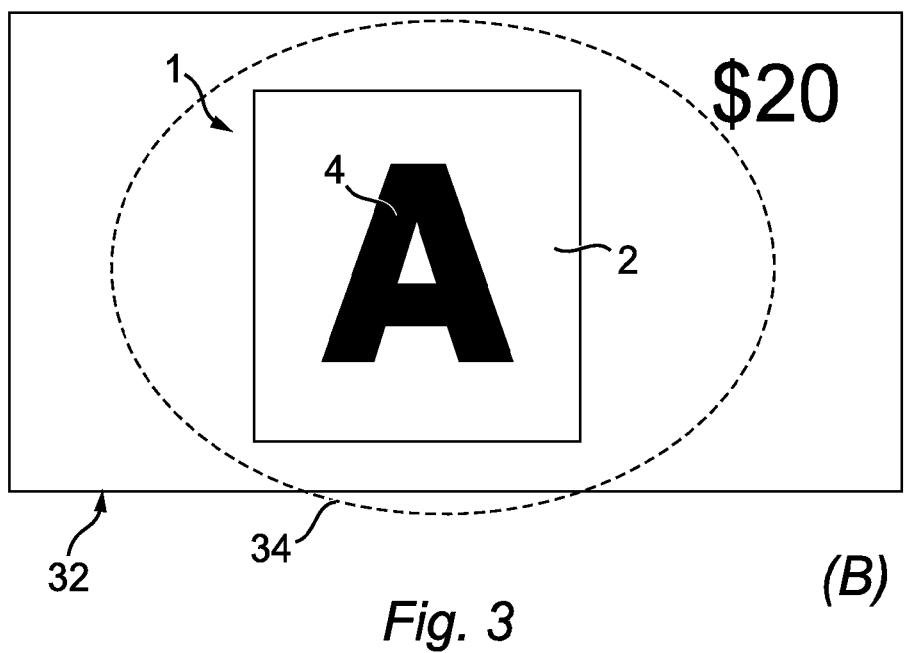

Referring to FIG. 3(a) and FIG. 3(b), a security document 32, in the form of a banknote, is shown having an optical security device 1. As described above, the optical security device 1 has first diffractive regions 2 and second diffractive regions 4 with an HRI layer added according to one of the embodiments previously mentioned. In this example, the combination of the HRI layer and diffractive elements form a covert security feature and, therefore, as shown in FIG. 3A, it is not possible to view any difference between the first and second diffractive regions 2, 4 (although the position of the second diffractive region 4 is shown in dashed lines to aid understanding, these dashed lines would not be viewable). In FIG. 3(b) an index matched material 34 has been placed onto the surface of the optical security device 1. As such, it is possible to view an image corresponding to the second diffractive region 4, in the form of a letter 'A'.

Figure 2:
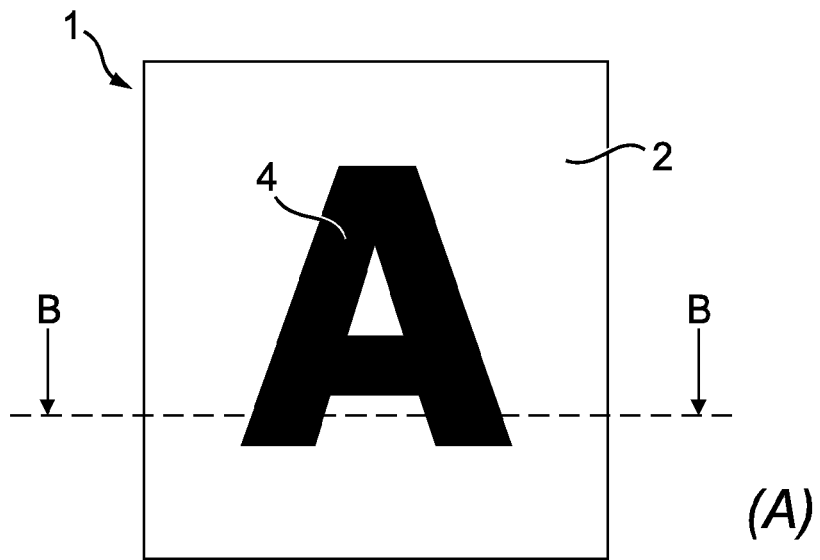
FIG. 2 illustrates:
(a) an optical security device including two portions,
(b) a cross-sectional view of the optical security device showing portions with varying depths of diffractive structure and an even thickness of HRI layer, and
(c) portions with varying depths of diffractive structure interchanged.
Figure 2:
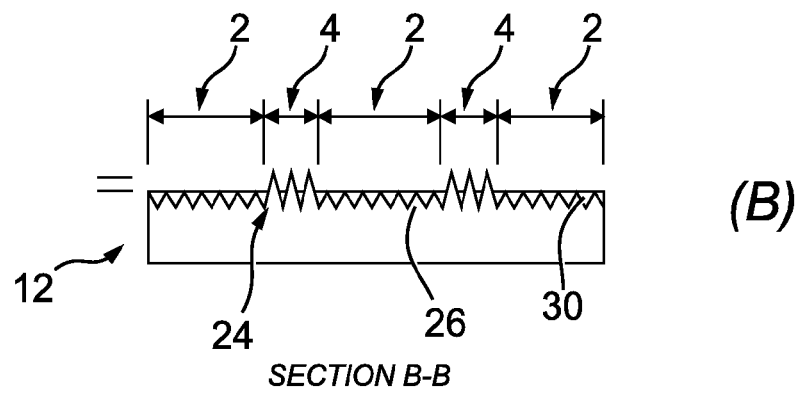
Figure 2:
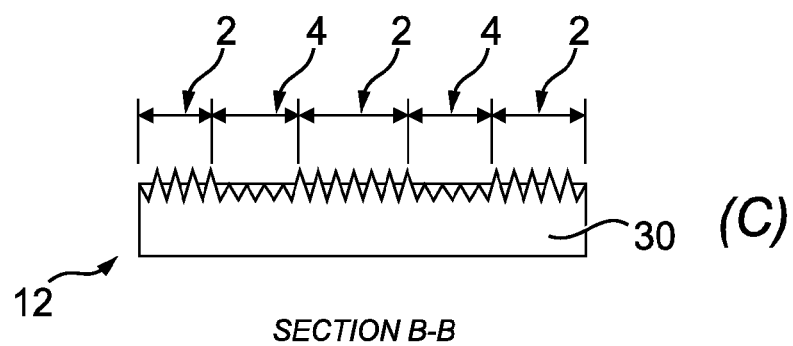

The optical security device as described in relation to FIGS. 1 and 2 can be manufactured using standard techniques. This is advantageous as the manufacture does not require specialised equipment. In particular, the HRI layer may be printed onto the diffraction layer surface. Where two or more thicknesses of HRI layer are required, it is only necessary to alter the set-up of the printing press, such as by altering the depth of the ink transferring cells on the printing cylinder, or other type of printing machine, to print the required thicknesses in the desired regions. The diffraction layers can be manufactured using known methods, such as, for example, embossing Above mentioned authentication methods are best suited for polymer bank notes. Although it is possible to apply optical security devices as described herein to paper substrates, a paper substrate may be more susceptible to damaged by the use of one or more of above mentioned authentication methods, such as, for example cooking oil or Scotch® tape. Therefore, paper substrates may not be repeatedly authenticated by the methods. Also, the above mentioned methods for authentication of optical security device could be automated. That is, an index matched authenticating material may be present in a vending machine which accepts banknotes having the optical security device present.

The optical security device described herein provides an additional level of security for diffractive devices, such as a diffractive optically variable device (DOVD). Particularly, the optical security device may be a transparent hologram, as, traditionally, it has been difficult to provide further levels of authentication to transparent holograms.

The optical security device has been described above as having a covert security feature, which is substantially imperceptible to a user of a security document or item having the optical security device without an authenticating item. However, it is also possible to provide an overt security feature using the same process. The only difference is the selection of the thickness of portion of the diffractive elements which are not covered by the HRI layer. If the thickness of the portion of the diffractive element not covered by the HRI layer is large enough, the brightness of the diffractive regions will be viewable in normal viewing conditions, that is, without an authenticating item.

It is also possible to have the image formed by the differing diffractive regions/HRI layer of an optical security device as described herein to be complimentary to the image or images formed by the diffractive structure itself. That is, for example, the image formed varying the thickness of an HRI layer on a transparent hologram, may be complimentary to the image formed by the transparent hologram.

By incorporating an optical security device as described herein on a security document such as a bank note, counterfeiting or replication of the optical security device, and, therefore, the banknote is made more difficult. To reduce risk of counterfeiting, an optical security device as described herein may be used in combination with other security enhancing techniques known in the art of security devices and security documents. Likewise, the inspection method of this invention may be employed in combination with other inspection methods for authenticating security documents.

Further modifications and alternatives may be made within the field of the skilled person in the art without departing from the scope of the invention. For example, it is possible to have sub-regions of the first diffractive region described above each having diffractive elements uncovered by the HRI layer to a different degree. In this manner, the sub-regions can be configured to have different brightness levels, either overtly or covertly, to generate a greyscale type image.

The claims defining the invention are as follows:

1. An optical security device including a diffraction layer having a plurality of diffraction elements and a high refractive index layer, wherein the high refractive index layer is applied on the diffraction layer such that first diffractive regions of the diffraction layer have upper portions of the corresponding diffraction elements which are uncovered by the high refractive index layer, wherein the high refractive index layer is present between adjacent uncovered upper portions, and second diffractive regions of the diffraction layer are substantially covered by the high refractive index layer.

2. An optical security device according to claim 1, wherein the first and second diffractive regions are arranged to form an image.

3. An optical security device according to claim 1, wherein the difference in coverage between the uncovered upper portions of the diffraction elements in the first diffractive regions and the substantially covered diffraction elements in the second diffractive regions cause a difference in brightness of the first and second diffractive regions which is substantially imperceptible when viewed by the human eye without any aids under normal lighting conditions, such that a covert security feature is formed.

4. An optical security device according to claim 1, wherein the difference in coverage between the uncovered upper portions of the diffraction elements in the first diffractive regions and the substantially covered diffraction elements in the second diffractive regions cause a difference in brightness of the first and second diffractive regions which is substantially perceptible when viewed by the human eye without any aids under normal lighting conditions, such that an overt security feature is formed.

5. An optical security device according to claim 1, wherein the diffraction layer has diffraction elements having depths which are substantially the same and the high refractive index layer is varied in thickness to partially cover diffraction elements in the first diffractive regions and substantially cover diffraction elements in the second diffractive regions.

6. An optical security device according to claim 1, wherein the high refractive index layer is of substantially constant depth and the diffraction layer has diffraction elements in the first diffractive regions having a first vertical dimension which is greater than the depth of the high refractive index layer and diffraction elements in the second diffractive regions having a second vertical dimension which is substantially the same as the depth of the high refractive index layer.

7. An optical security device according to claim 1, wherein the first diffractive regions have sub-regions where the amount that the upper portions of the diffraction elements are uncovered is varied.

8. An optical security device according to claim 7, wherein the sub-regions of the first diffractive regions form areas of a greyscale image.

9. An optical security device according to claim 1, wherein the diffraction layer is one or more of the following: a transparent hologram; a reflective hologram; or a diffractive optical variable device.

10. A security document including an optical security device as claimed in claim 1.

11. A method of manufacturing an optical security device including forming a diffraction layer having a plurality of diffraction elements and a high refractive index layer, wherein the high refractive index layer is applied on the diffraction layer such that first diffractive regions of the diffraction layer have upper portions of the corresponding diffraction elements which are uncovered by the high refractive index layer, wherein the high refractive index layer is present between adjacent uncovered upper portions, and second diffractive regions of the diffraction layer are substantially covered by the high refractive index layer.

12. A method of manufacturing an optical security device as claimed in claim 11, wherein the high refractive index layer is printed on to the diffraction layer.

13. A method of authenticating an optical security device according to claim 1, the method including contacting the optical security device with an index matched material and subsequently inspecting for change in brightness of a portion of the an optical security device.

\* \* \* \* \*